United States Patent
Reezigt et al.

(10) Patent No.: US 7,842,750 B2
(45) Date of Patent: Nov. 30, 2010

(54) POLYMER COMPOSITION CONTAINING A HEAT ACCUMULATING PHASE-CHANGE MATERIAL, A PROCESS FOR PRODUCING SUCH A COMPOSITION AND A PRODUCT IN WHICH SUCH A COMPOSITION IS INCLUDED

(75) Inventors: Herman Reezigt, Ootmarsum (NL); Bartholomeus Wilhelmus Maria Rouwers, Ootmarsum (NL); Hendrik Glastra, Enschede (NL)

(73) Assignee: Capzo International B.V. (NL)

( * ) Notice: Subject to any disclaimer, the term of this patent is extended or adjusted under 35 U.S.C. 154(b) by 70 days.

(21) Appl. No.: 12/089,271

(22) PCT Filed: Oct. 5, 2006

(86) PCT No.: PCT/NL2006/000505

§ 371 (c)(1),
(2), (4) Date: May 9, 2008

(87) PCT Pub. No.: WO2007/040395

PCT Pub. Date: Apr. 12, 2007

(65) Prior Publication Data

US 2008/0255299 A1      Oct. 16, 2008

(30) Foreign Application Priority Data

Oct. 6, 2005 (NL) .................................. 1030122

(51) Int. Cl.
*C08F 220/10* (2006.01)
*C08F 220/04* (2006.01)
*C08K 3/24* (2006.01)

(52) U.S. Cl. ..................... 524/556; 524/560; 528/421; 528/425; 526/273

(58) Field of Classification Search ................ 524/560; 526/273; 528/524, 421
See application file for complete search history.

(56) References Cited

U.S. PATENT DOCUMENTS 4,585,843 A * 4/1986 Flesher et al. ................. 526/63

FOREIGN PATENT DOCUMENTS

EP      693542 A1 *  1/1996
EP      0696542       1/1996

* cited by examiner

*Primary Examiner*—Satya B Sastri
(74) *Attorney, Agent, or Firm*—Seyed Kaveh E. Rashidi-Yazd, Esq.; Ryan A. Schneider, Esq.; Troutman Sanders LLP

(57) ABSTRACT

The invention provides a polymer composition which contains a bound heat accumulating phase change material which is in the form of a solid or a paste. This composition is so stable and has such a solid form that it may be easily heated up to 180 (200)° C. and mechanically treated without changing the structure and the composition thereof and without losing its phase change materials. After being heated up the heat emission of this composition is steady and consequently the composition has a long radiation time. Furthermore the polymer composition is easy to produce and has due to its special properties a lot of applications.

14 Claims, 1 Drawing Sheet

Material Aluminum 1 piece

Material Aluminum 1 piece

Figure 1:
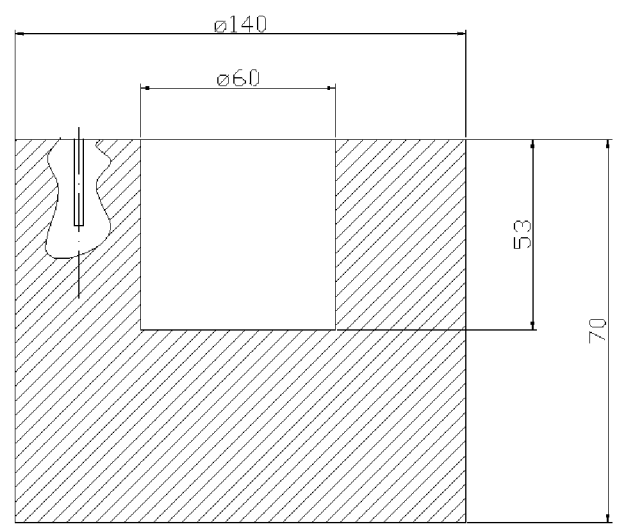

POLYMER COMPOSITION CONTAINING A HEAT ACCUMULATING PHASE-CHANGE MATERIAL, A PROCESS FOR PRODUCING SUCH A COMPOSITION AND A PRODUCT IN WHICH SUCH A COMPOSITION IS INCLUDED

BENEFIT CLAIMS

This application is a US National Stage of International Application No. PCT/NL2006/000505, filed 5 Oct. 2006, which claims the benefit of NL 1030122, filed 6 Oct. 2005.

Phase change materials (PCMs) with the property that they transform by adsorbing heat from a solid or semi-solid phase to a liquid phase—and, by emitting the same heat, transform back from the liquid phase to the solid phase—are commonly known. They are, depending on their phase change temperature, used as a heat accumulating material.

Polymer compositions that contain heat accumulating phase change materials are known from, among others, the publications WO 03068414, U.S. Pat. No. 5,637,389, EP 56591, WO 03085346, EP 693542, U.S. Pat. Nos. 4,585,843, 6,200,681, 5,709,945, US 200388019 and DE 10218977.

From WO 03068414 a silicon rubber is known in which a PCM is dispersed. The PCM is contained or enclosed in the rubber matrix.

U.S. Pat. No. 5,637,389 describes a composition of a foam material through which microcapsules, containing PCMs, are dispersed completely.

EP 56591 describes a composition in which molten PCM is adsorbed in a polymer matrix, such as polyurethane foam.

WO 03085346 describes a wall lining containing PCM particles, which are adsorbed in a polymer matrix or are bound to a woven material by a coating.

EP 693542 describes a polymer composition on the basis of a PCM, water and a water-swellable polymer crosslinker. The PCM is contained in a hydrogel.

U.S. Pat. No. 4,585,843 describes a bulk gel polymerization process, which makes use of a "heat sink material". The final product is a gel in which the "heat sink material" is dispersed.

U.S. Pat. Nos. 6,200,681 and 5,709,945 describe a microcapsule that contains a PCM as the core material and a polymer as the shell.

In the above mentioned compositions the heat-accumulating PCMs are dispersed or taken up in a polymer structure. A great disadvantage is that these compositions are not stable. Under large mechanical stress or exposure to high temperatures, above 100° C., these compositions will degrade and lose their polymer properties. Particularly, these known compositions will lose their heat accumulating properties when repeatedly used, or are exposed to high temperatures and large mechanical stress. Thus their use is limited. Another disadvantage is that these compositions are expensive, since the preparation methods are complex and time consuming.

Furthermore, DE 10218977 describes a PCM around which at least one polymer shell is formed. The polymer shell is bound to the surface of the PCM material by a coupling reagent. However, this material needs at least one cover layer in order to bind the PCM to the surface. Deterioration of the cover layer results in a decline of the heat accumulating properties. Another disadvantage is that the composition is quite a complex.

The present invention is based on the insight that great advantages and new possibilities arise when a polymer composition is stabile enough to maintain long their properties and may be used under many conditions, hereby opening a wide range of new applications.

To this end the present invention provides a polymer composition which contains heat accumulating PCM, characterized in that the composition is based on at least one monomer that is directly bound to at least one PCM.

In the composition according to the present invention the PCM is not just bound directly to the surface of the polymer, but also in the internal parts of the polymer. The bonding is directly and strong. Through the strong bonding the polymer composition of the present invention is exceptionally stable. The polymer composition is stable at higher temperatures (70-180° C.) as well as under high mechanical stress. Even under the adsorption of heat, for example by changing from a solid state to a semi-solid or liquid phase another, at least one PCM remains bound to the polymer. One can say that there is a new composition or substance. At temperatures above the melting point of the PCM separation of the crystal water is not or hardly observed, in the composition according to the present invention, which is very favorable for the heat accumulating properties of the composition. In the present invention it is not required that the PCM is encapsulated by a cover layer, is brought into a matrixshape in the cells of a matrix, or is bound via an intermediate or coupling agent, in order to prevent the loss of the material. Since the composition of the present invention is so stable and the internal structure of the composition is completely provided with bound PCM, the heat accumulation and—emission properties of this compositions are very great. Moreover, the composition shows a steady emission of heat, which is quite extraordinary. Further the composition maintains typical properties of a polymer, such as plastic deformation at higher temperatures. Thanks to these extraordinary properties the composition is suited as a final—and intermediate product. The composition according to the invention can be a solid, maintaining its shape, also at 70-180° C., or a paste-like substance.

The composition of the present invention can be used as an additive to a wide variety of materials, especially to building materials, such as concrete, bricks and heat resistant construction sheets and construction elements, to textile and to polymeric materials such as plastic pipes which offers a whole range of new possibilities for heating and energy storage.

Examples of monomers that can be used for the present invention are: vinyl compounds, polyols or multiple alkanols, sulfides and epoxy compounds that possess a functional group that binds to a accumulating PCM. Especially, (meth)acrylic acid and 2,2-bis(hydroxymethyl)propanic acid, and the salts thereof may be used in the present invention.

A known type of PCMs can be used. It can be a hydrate of an organic or inorganic salt and in particular sodium acetate trihydrate. In order to bind the salt hydrate, monomers are used with for example acid- or neutralized acid groups as functional group. The salt hydrate is bound directly to the polymer through these groups. Experimental results show that 1 acid group can bind 6 salt hydrates of one type, or that 1 monomer can form a crystal lattice with 6 salt hydrates. The bonding is therefore, the bond between the hydrate of the salt and neutralized acid group of the polymer. This binding seems to be an ion-dipole binding. The monomers can also bind directly to several different PCMs, which results in a polymer composition according to the invention with different phase-change temperature ranges, for example one at 20-32° C. and 40-60° C. Moreover, the composition of the present invention can be encapsulated or coated in order to obtain an inert surface.

The preferred embodiment of the composition of the present invention are defined in claims 2 through 11.

The present invention also relates to a method of preparation of the polymer composition with a heat accumulating PCM. Well known techniques are performed by dispersing or suspending heat accumulating PCMs in certain polymers and the subsequently forming a gel or matrix by crosslinking. Other techniques are known in which PCMs are encapsulated or coated. Moreover, it is known that porous materials, such as foams, can be filled with PCMs using vacuum techniques. Other methods are known in which PCMs are mixed or dispersed with monomers in order to obtain a polymer composition of polymers with a distribution or dispersion of PCMs in a polymer matrix. The disadvantages of these known techniques are that they are complex and time consuming, making them very expensive. Moreover, the so obtained compositions are not stable, but most important is these known compositions will decompose and lose their polymeric properties under mechanical stress or exposure to temperatures above 100° C. Especially these known compositions will lose their heat accumulating properties under repeated use or mechanical stress.

The present invention relates also to a method of preparation, in which a mixture of molten heat accumulating PCM and monomers are polymerized, resulting in a polymer composition in which the PCM is so strongly bound to the formed polymer, that the thus obtained composition is stable at high temperatures (70-180° C.) or under mechanical treatments, and has excellent heat accumulating and—emitting properties.

The present invention provides further a method of preparation for the polymer composition containing heat accumulating PCM, characterized in that a mixture of components mentioned in one of the enclosed claims 1 through 11, is polymerized in a normal way.

The method of preparation of the present invention has the advantage that it's simple, straightforward and that one obtains directly and fast a stable polymer composition containing a heat accumulating PCM, as a stable composition.

The monomers, prepolymers and PCMs that can be used for the present invention are in itself well known compounds. In the paragraphs below some examples of compounds of the preferred embodiment of the present invention are mentioned. The polymerization is performed in a normal way, commonly known as radical chain- and step polymerization. Acrylic monomers can be polymerized by radical chain polymerization using a thermal decomposable compound, such as Vazo® 52 (2,2'-azobis(2,4-dimethylvaleronitrile). An example of step polymerization is the addition reaction between a polyol and an isocyanate, can be accelerated by a catalyst, such as Dabco® 33-LV (Air Products). An advantage of the two mentioned methods is that these polymerizations can be performed under normal conditions and at various temperatures.

The advantage of the polymer composition according the present invention in the form of an additive, and certainly in the form of a liquid or paste, is that it is easy and straightforward to apply to existing processes. For example, the polymer composition can be in situ polymerized in a softener, such as diisononylfthalate or in a polyol, in the same way Terathane® 1000, can be simply added to existing coating formulations. In such a way the applicability of the polymer composition according the present invention is not hindered by complex and economically unfeasible techniques, such as vacuum techniques or the encapsulation of PCMs.

The PCMs are preferably in molten state with a mixture of acrylic monomers. Hydrates of salts having a higher content of hydrated water will be formed if a solution of PCMs is used rather than PCMs in molten state. Because the hydrates have a lower melting point than the corresponding hydrates having lower content of hydrated water, they are undesirable.

If desirable, one can in the preparation of a polymer composition comprising a heat accumulating PCM, first polymerize the mixture of the first monomer and the PCM in a usual way, to for example a gel, and subsequently blend the resulting product with at least a second monomer or prepolymer and, after which polymerize the obtained mixture in the usual way. Using this method one can bind PCM to a polymer and subsequently the polymer having the PCM will be taken up in the matrix of a second polymer. It is important for this method of preparation that the PCMs present in the mixture are crystallized out. This can be done by cooling the mixture or by adding a seed crystal for instance.

For the use of the polymer composition as a final product it is favorable that the composition according to the invention is a stable substance.

The exclusive rights include further a product in which the polymer composition according to the invention, as well as a process for the production of this is applied.

When the present composition results in a solid form, it can be ground and the resulting particles, granules or powder can be used as an additive. On the other hand, when the composition is a soft solid substance, it can be more easily applied to other materials.

Besides in building materials and polymer materials, the composition of the present invention can be used in: hot water bottles, plates for keeping food warm, teddy bears, insulators or heating devices for engines, industrial installations, thermo packs for medical purposes, shoe soles, hand gloves, antifreeze, and heating systems, particularly floor heating and insulating materials. The possible applications are nearly unlimited.

The invention will be further explained to the non-restricting examples 1 through 6.

EXAMPLE 1

Polymer Composition on the Basis of Sodium Acrylate and Sodium Acetate Trihydrate The following components are processed in a 2 liter reactor into a heat accumulating phase change material.
1. 800 g sodium acetate trihydrate
2. Heat to 70° C., clear liquid
3. Add stepwise 200 g sodium acrylate
4. Heat to 70° C. while stirring (600 RPM) to a homogeneous mass
5. Add 9 g initiator solution consisting of (3 g Vazo 52 and 6 g Silquest A-1100)
6. Stir for 30 s at 600 RPM
7. Pour the reaction mixture within 30 s into an isolated container in which the bulk polymerization can occur for at least 8 hours.

The resulting product is, above the phase change temperature, a paste-like substance in which the salt hydrate is bound to the polymer. Below the phase change temperature is the product a firm and crisp material.

EXAMPLE 2

Polymer Composition on the Basis of Methacrylic Acid and Sodium Acetate Trihydrate The following components are processed in a 2 liter reactor into Thermusol.

1. 800 g sodium acetate trihydrate
2. Heat to 70° C., clear liquid
3. Add stepwise 200 g methacrylate
4. Heat to 70° C. while stirring (600 RPM) to a homogeneous mass
5. Add 9 g initiator solution consisting of (3 g Vazo 52 and 6 g Silquest A-1100)
6. Stir for 30 s at 600 RPM
7. Pour the reaction mixture within 30 s into an isolated container in which the bulk polymerization can occur for at least 8 hours.

The resulting PCM is, above the phase change temperature, highly viscous and paste-like substance in which the salt hydrate is bound to the polymer. Below the phase change temperature the product is a firm and brittle material.

EXAMPLE 3

Polymer Composition on the Basis of Two Monomers, Acrylic Acid and Laromer 8765 (BASF), and Two Salt Hydrates, Sodium Acetate Trihydrate and Sodium Sulfate Decahydrate The following components are processed in a 2 liter reactor into a heat accumulating phase change material.
1. 395.5 g sodium acetate trihydrate
2. Heat to 70° C., clear liquid
3. Add 395.5 sodium sulfate decahydrate
4. Heat to 70° C., clear liquid
5. Add stepwise 200 g monomer blend
6. Heat to 70° C. while stirring (600 RPM) to a homogeneous mass
7. Add 9 g initiator solution consisting of (3 g Vazo 52 and 6 g Silquest A-1100)
8. Stir for 30 s at 600 RPM Pour the reaction mixture within 30 s into an isolated container in which the bulk polymerization can occur for at least 8 hours.

Preparation of the monomer blend in a 2 liter reactor:
1. 437.5 g 90% acrylic acid
2. 438.2 g Laromer 8765 (BASF)
3. 108 g glycerol
4. Add stepwise 192 g 500 NaOH
5. Stir during the process at 600 RPM, cool down the mixture An interesting property of the product is that it is a stable and solid substance above the melting points of the salthydrates. Moreover, this composition has two phase change temperatures, namely 20-30° C. and 40-60° C., trajects in which the heat is accumulated.

EXAMPLE 4

Polymer Composition on the Basis of Two Monomers, Acrylic Acid and Laromer 8765 (BASF) and Sodium Acetate Trihydrate, Encapsulated with a Silane 1. Heat 600 g line oil to 70° C.
2. Add stepwise the following mixture
   a) 316 g sodium acetate trihydrate, 70° C.
   b) 80 g monomer blend, 70° C.
   c) 1.33 g Vazo 52 and 2.7 g Silquest A-1100
3. Heat to 70° C. while stirring at 600 RPM for 60 min
4. Cool mixture down to 35° C. while stirring at 400 RPM
5. Add 80 g silane XL-33 (Wacker)
6. Stir for 120 min at 400 RPM, 35° C.

Preparation of the monomer blend in a 2 liter reactor:
1. 437.5 g 90% acrylic acid
2. 438.2 g Laromer 8765 (BASF)
3. 108 g glycerol
4. Add stepwise 192 g 50% NaOH Stir during the process at 600 RPM, cool down the mixture.

The particularity of this composition is that it is a dispersion of a heat accumulating material that is in a carrier. In this case it's not necessary to grind and disperse the final product as described in example 6. The surface of the heat accumulating material can be modified by varying the functional groups of the silane.

EXAMPLE 5

Polymer Composition on the Basis of Two Monomers, Acrylic Acid and Laromer 8765 (BASF) and a Salt Hydrate, Sodium Sulfate Decahydrate The following components are processed in a 2 liter reactor into a heat accumulating phase change material.
1. 800 g sodium sulfate decahydrate
2. Heat to 70° C., clear liquid
3. Add stepwise 200 g monomer blend
4. Heat to 70° C. while stirring (600 RPM) to a homogeneous mass
5. Add 9 g initiator solution consisting of (3 g Vazo 52 and 6 g Silquest A-1100)
6. Stir for 30 s at 600 RPM
7. Pour the reaction mixture within 30 s into an isolated container in which the bulk polymerization can occur for at least 8 hours.

Preparation of the monomer blend in a 2 liter reactor:
1. 437.5 g 90% acrylic acid
2. 438.2 g Laromer 8765 (BASF)
3. 108 g glycerol
4. Add stepwise 192 g 500 NaOH
5. Stir during the process at 600 RPM, cool down the mixture.

The product is a stable and solid compound below as well as above the phase change temperature (20-35° C.).

EXAMPLE 6

Polymer Composition on the Basis of Two Monomers, Acrylic Acid and Laromer 8765 (BASF) and a Salt Hydrate, Sodium Acetate Trihydrate The following components are processed in a 2 liter reactor into a heat accumulating phase change material.
8. 800 g sodium acetate trihydrate
9. Heat to 70° C., clear liquid
10. Add stepwise 200 g monomer blend
11. Heat to 70° C. while stirring (600 RPM) to a homogeneous mass
12. Add 9 g initiator solution consisting of (3 g Vazo 52 and 6 g Silquest A-1100)
13. Stir for 30 s at 600 RPM
14. Pour the reaction mixture within 30 s into an isolated container in which the bulk polymerization can occur for at least 8 hours.

Preparation of the monomer blend in a 2 liter reactor:
6. 437.5 g 90% acrylic acid
7. 438.2 g Laromer 8765 (BASF)
8. 108 g glycerol
9. Add stepwise 192 g 50% NaOH
10. Stir during the process at 600 RPM, cool down the mixture.

| The resulting product has the following properties. | |
|---|---|
| Appearance | Solid |
| Density substance | 1150 kg/m$^3$ |
| Density powder | 800 kg/m$^3$ |
| Color | White |
| Heat capacity | 2500 J/kg · K |
| Latent heat capacity* | 160 kJ/kg |

*= Average value between the temperatures 40° C. to 60° C.

The heat storage capacity is measured as follows. The sample is placed in the sensor, shown in appendix 1, in which in an isolated room the heat uptake of the sample and the heat emission of the sensor is measured. The sensor has a starting temperature of 80° C., is made of alumina and has a heat capacity of 910 J/kg·K and has a mass of 2.553 kg. The following formulas are used to calculate the heat storage capacity.

$$Qabsorbed = Qemitted$$

$$Qsensor = Qsample$$

$$m \times c \times \Delta T = (m \times c \times \Delta T)$$

$$c_{sample} = ((m_{sensor} \times c_{sensor} \times \Delta T_{sensor})) \times \frac{1}{(m_{sample} \times \Delta T_{sample})}$$

The Aluminum sensor is illustrated in FIG. 1

Table with comparison between PCM materials.

| Material | Phase change temperature (° C.) | Latent heat capacity (kJ/kg) | Form under Phase change temperature | Form above Phase change temperature |
|---|---|---|---|---|
| Hexadecane | 12.2 | 237 | Wax | Liquid |
| Heptadecane | 16.5 | 213 | Wax | Liquid |
| Octadecane | 25.4 | 244 | Wax | Liquid |
| Nonadecane | 26.4 | 222 | Wax | Liquid |
| Eicosane | 30.6 | 247 | Wax | Liquid |
| Heneicosane | 35.9 | 213 | Wax | Liquid |
| Calcium chloride hexahydrate | 29.4 | 170 | Solid | Liquid |
| Sodium hydrogen phosphate dodecahydrate | 36.0 | 280 | Solid | Liquid |
| Magnesium chloride tetrahydrate | 58.0 | 180 | Solid | Liquid |
| Rubitherm ® RT 58 | 48-62 | 181 | Solid | Liquid |
| Rubitherm ® RT 41 | 35-50 | 155 | Solid | Liquid |
| Product example 5 | 20-35 | 170 | Solid | Solid |
| Sodium acetate trihydrate | 58 | 160 | Solid | Liquid |
| Product example 6 | 50-60 | 160 | Solid | Solid |

The invention claimed is:

1. A heat storage polymer composition comprising a heat accumulating phase change material, the heat storage polymer composition comprising:
   a polymer formed from:
      a first monomer to which the phase change material is bonded; and
      at least one second monomer or pre-polymer determining the physical properties of the composition;
   wherein the phase change material is solid both below and above a phase change temperature of the phase change material,
   wherein the phase change material is a salt hydrate, and
   wherein the second monomer is an aliphatic epoxy acrylate.

2. The composition according to claim 1, wherein the polymer comprises from 1 to 90 mol % of the first monomer, the balance being the second monomer or pre-polymer.

3. The composition according to claim 1, wherein the first monomer contains a functional group to which the phase change material is bonded.

4. The composition according to claim 1, wherein the polymer comprises a matrix to which the phase change material is bonded.

5. The composition according to claim 1, wherein the first monomer is a vinyl compound or a hydroxyl compound that contains a carboxyl group and salts.

6. The composition according to claim 1, wherein the salt hydrate comprises sodium acetate trihydrate.

7. The composition according to claim 1, wherein the composition contains a plurality of phase change materials.

8. The composition according to claim 1, wherein the composition comprises a polyacrylate to which sodium acetate trihydrate is bonded, the polyacrylate being incorporated in a matrix of polyurethane.

9. A second composition comprising a heat accumulating phase change material wherein the second composition is a liquid or a paste that is an additive comprising the composition according to claim 1 as a solid particle.

10. The second composition according to claim 9, wherein the particles are coated with a protective layer.

11. The second composition according to claim 9, wherein the liquid comprises a polymer composition comprising a polyol or a diisononylphtalate.

12. A heat accumulating product comprising as an additive the polymer composition according to claim 11.

13. A product according to claim 12, wherein the additive has been applied as a granulate or powder.

14. The product according to claim 12, wherein the additive has been applied as a liquid or paste.

* * * * *